US010801897B2

(12) United States Patent
Wu et al.

(10) Patent No.: US 10,801,897 B2
(45) Date of Patent: Oct. 13, 2020

(54) THERMOMETER AND TEMPERATURE MONITORING SYSTEM

(71) Applicant: Grandex International Corporation, New Taipei (TW)

(72) Inventors: Chwan-Chia Wu, New Taipei (TW); Mendel Lin, New Taipei (TW)

(73) Assignee: Grandex International Corporation, New Taipei (TW)

( * ) Notice: Subject to any disclaimer, the term of this patent is extended or adjusted under 35 U.S.C. 154(b) by 434 days.

(21) Appl. No.: 15/893,967

(22) Filed: Feb. 12, 2018

(65) Prior Publication Data

US 2019/0250043 A1    Aug. 15, 2019

(51) Int. Cl.

| G01K 1/02 | (2006.01) |
| H04W 4/80 | (2018.01) |
| H04L 29/08 | (2006.01) |
| G01K 13/00 | (2006.01) |
| G01K 3/00 | (2006.01) |
| H04W 84/12 | (2009.01) |

(52) U.S. Cl.
CPC ............. *G01K 1/024* (2013.01); *G01K 1/022* (2013.01); *G01K 1/026* (2013.01); *G01K 3/005* (2013.01); *G01K 13/00* (2013.01); *H04L 67/26* (2013.01); *H04W 4/80* (2018.02); *G01K 2207/06* (2013.01); *H04W 84/12* (2013.01)

(58) Field of Classification Search
None
See application file for complete search history.

(56) References Cited

U.S. PATENT DOCUMENTS

| 3,931,620 | A  | * | 1/1976 | Wellman, Jr. | F24C 7/08 340/599 |
| 7,019,638 | B1 | * | 3/2006 | Wallace | G01K 1/024 340/531 |
| 7,605,349 | B2 | * | 10/2009 | Gaynor | A47J 27/004 165/47 |
| 7,703,389 | B2 | * | 4/2010 | McLemore | A47J 37/1209 340/501 |
| 8,783,167 | B1 | * | 7/2014 | Titel | G01K 1/026 99/325 |
| 8,931,400 | B1 |   | 1/2015 | Allen | |
| 9,341,518 | B2 | * | 5/2016 | Batti | G01F 23/22 |
| 9,445,726 | B2 | * | 9/2016 | Toriumi | G01K 13/002 |
| 10,060,802 | B1 | * | 8/2018 | Ragosta | G01K 13/002 |

(Continued)

FOREIGN PATENT DOCUMENTS

WO    2017020973 A1    2/2017

*Primary Examiner* — Chico A Foxx
(74) *Attorney, Agent, or Firm* — Thomas J. Nikolai; DeWitt LLP

(57) ABSTRACT

A temperature monitoring system includes a thermometer and a first communication device. The thermometer counts a monitoring time, executes a measuring procedure to acquire a first temperature value and a second temperature value to determine whether to wirelessly broadcast a temperature information signal, and executes a time interval producing procedure after the measuring procedure to determine a time interval and to determine whether the measuring procedure is terminated. The first communication device receives the temperature information signal from the thermometer. The user may remotely monitor the temperature of a monitored object through the first communication device.

14 Claims, 14 Drawing Sheets

(56) References Cited

U.S. PATENT DOCUMENTS

| | | | |
|---|---|---|---|
| 10,088,371 B2* | 10/2018 | Kaiser | B65D 51/24 |
| 2002/0095269 A1* | 7/2002 | Natalini | G05B 23/0283 |
| | | | 702/188 |
| 2002/0124737 A1* | 9/2002 | Bedetti | A47J 43/28 |
| | | | 99/342 |
| 2003/0007544 A1 | 1/2003 | Chang et al. | |
| 2005/0012627 A1* | 1/2005 | Lion | G01K 1/024 |
| | | | 340/584 |
| 2007/0055171 A1* | 3/2007 | Fraden | G01K 7/42 |
| | | | 600/549 |
| 2007/0068935 A1* | 3/2007 | Furlanetto | F24C 7/085 |
| | | | 219/681 |
| 2013/0128919 A1* | 5/2013 | Austen | G01K 1/14 |
| | | | 374/110 |
| 2014/0028445 A1* | 1/2014 | Wild | G06K 7/0008 |
| | | | 340/10.3 |
| 2014/0053586 A1* | 2/2014 | Poecher | F24F 11/30 |
| | | | 62/126 |
| 2014/0086274 A1* | 3/2014 | Henke | G01K 1/026 |
| | | | 374/142 |
| 2015/0059469 A1* | 3/2015 | Batti | G01F 23/22 |
| | | | 73/295 |
| 2015/0145693 A1* | 5/2015 | Toriumi | A61B 5/746 |
| | | | 340/870.17 |
| 2015/0173129 A1* | 6/2015 | Tils | G01K 1/026 |
| | | | 374/1 |
| 2016/0377490 A1* | 12/2016 | Nivala | G01K 1/024 |
| | | | 374/155 |
| 2017/0150841 A1* | 6/2017 | Johncock | A47J 43/283 |
| 2017/0248474 A1 | 8/2017 | Nielsen et al. | |
| 2019/0049314 A1* | 2/2019 | Chu | G01K 1/08 |
| 2019/0101460 A1* | 4/2019 | Calhoun, Jr. | G01K 1/026 |
| 2019/0323898 A1* | 10/2019 | Kyaw | H04W 4/38 |
| 2019/0357857 A1* | 11/2019 | Tanaka | A61B 5/05 |
| 2020/0096393 A1* | 3/2020 | Lion | G01K 1/024 |

* cited by examiner

THERMOMETER AND TEMPERATURE MONITORING SYSTEM

BACKGROUND OF THE INVENTION

1. Field of the Invention

The present invention relates to a monitoring device, and a monitoring system, and more particularly to a thermometer, and a temperature monitoring system.

2. Description of the Related Art

Some foods are prepared according to individual preference. Temperature accuracy is particularly important in food preparation. For example, meats that are served in the form of steaks, roasts, and the like may be cooked rare, medium-rare, medium, medium-well, or well-done. These different cooking preferences are often referred to as "doneness". Beef is one kind of meat that is particularly suitable for different levels of doneness. On the other hand, many individuals prefer to have certain kinds of meat cooked well-done. Such well-done meats typically include poultry and pork. Cooking to an accurate temperature is critical in gourmet cooking and to avoid undercooking or overcooking food items. Therefore, a cook may use a thermometer to accurately measure the temperature of food being cooked.

Moreover, one kind of the thermometers may be an electronic thermometer. The electronic thermometer cannot withstand the temperatures inside a cooking vessel, such as an oven or barbeque grill, while the food is cooking. This is because of temperature limitations of electronics, displays, batteries, and the like. Thus, the electronic thermometers cannot be left inside a cooking vessel during the cooking process. The user must periodically insert the electronic thermometer into the food, obtain a current temperature, and then remove the thermometer prior to further cooking. This is inconvenient and increases the cooking time as an enormous amount of heat is lost during the measurement, and may increase the risk of the food being overcooked if checked too late.

To overcome this disadvantage, some thermometers build the control unit in a separate housing that is placed outside the cooking vessel and is connected to a temperature sensing probe via an electrical wire.

However, having an electrical wire between the temperature sensing probe and control unit has many disadvantages: it is cumbersome when cooking, it cannot be used in closed cooking vessels, it cannot be used in rotating cooking vessels, and so forth. Therefore, thermometers are needed to be improved.

SUMMARY OF THE INVENTION

An objective of the present invention is to provide a thermometer, and temperature monitoring system. The thermometer may continuously monitor temperature of a monitored object and may wirelessly transmit temperature signals to a communication device. Therefore, a user may read a temperature of the monitored object through the communication device.

To achieve this objective, the thermometer is provided for measuring temperature of the cooking food and transmitting the temperature data. The communication device is provided for receiving the temperature data and displaying the temperature data. In one embodiment, a temperature monitoring method may be executed by the thermometer, and may include steps of measuring temperature of cooking food using the thermometer, transmitting measured temperature data from the thermometer, receiving temperature data from the communication device in proximity to the thermometer, and displaying temperature data on the display of the communication device.

In another embodiment, the present invention provides the temperature monitoring system with the ability to monitor food temperature from remote locations. The temperature monitoring system comprises the thermometer, the communication device, and a signal repeater. The signal repeater may receive the temperature data from the thermometer, the communication device may connect to the signal repeater, and the communication device may acquire the temperature data from the signal repeater. In a third embodiment, the temperature monitoring system further comprises a cloud server. The signal repeater further sends the temperature data to the cloud server. The communication device connects to the cloud server to acquire the temperature data.

Another objective of the present invention provides the temperature monitoring system to issue a notification to the communication device when a food temperature value reaches a warning temperature value, desired temperature or when an abnormal temperature occurs in the cooking environment. In one embodiment, the signal repeater receives the temperature data from the thermometer. The signal repeater compares received temperature data to preprogrammed cooking information, and the signal repeater sends a notification signal to the cloud server when one of the temperature data points meets a condition defined in the cooking information.

It is another objective to provide the thermometer for efficient power management to reduce power consumption of operation to sustain battery life to the largest extent. In one embodiment, the thermometer establishes a communication session to communicate with the communication device. The communication device transmits preprogrammed cooking information to the thermometer. The thermometer ends the communication session, and the thermometer starts a temperature monitoring session. The thermometer determines time to measure temperature with reference to measured temperature data, and cooking time. The thermometer measures and obtains temperature data. The thermometer further transmits temperature data when measured temperature data satisfies a predetermined condition, and the thermometer ends the temperature monitoring session when the cooking process is complete.

It is further an objective of the present invention to provide a system for estimating remaining time of the cooking process so that user can obtain information about how long the cooking process will take.

Other objectives, advantages and novel features of the invention will become more apparent from the following detailed description when taken in conjunction with the accompanying drawings.

DETAILED DESCRIPTION OF THE INVENTION

The present invention relates to a device for monitoring temperature of a monitored object, such as food, wirelessly, and further relates to a thermometer that measures an internal temperature of the food and an ambient temperature of a cooking vessel for cooking the food, and is based on Bluetooth technology, such as Bluetooth Low Energy (BLE) that transmits measured temperatures to a first communication device.

Figure 1:
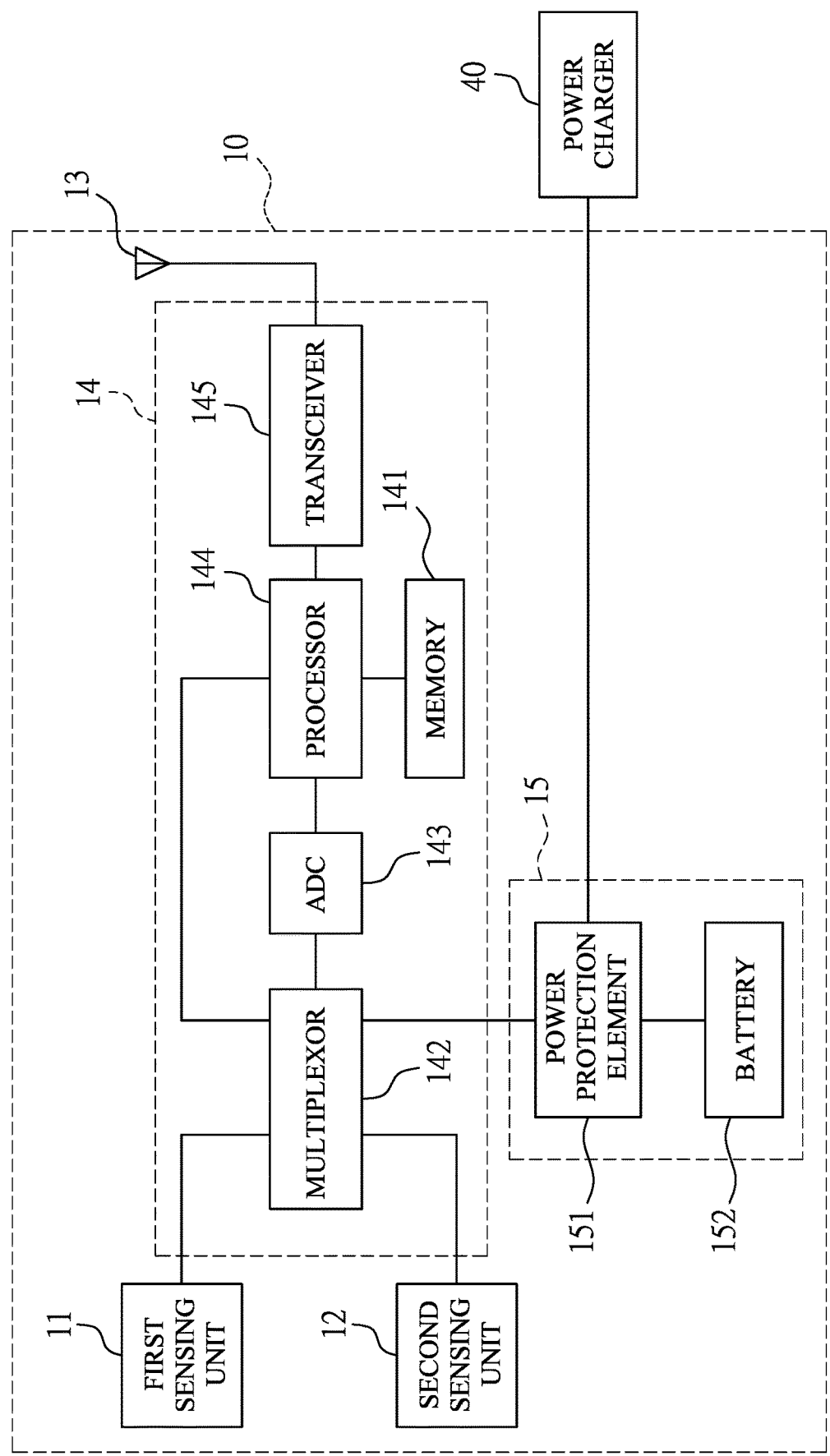
FIG. 1 is a block diagram of an embodiment of a thermometer of the present invention.
Figure 2:
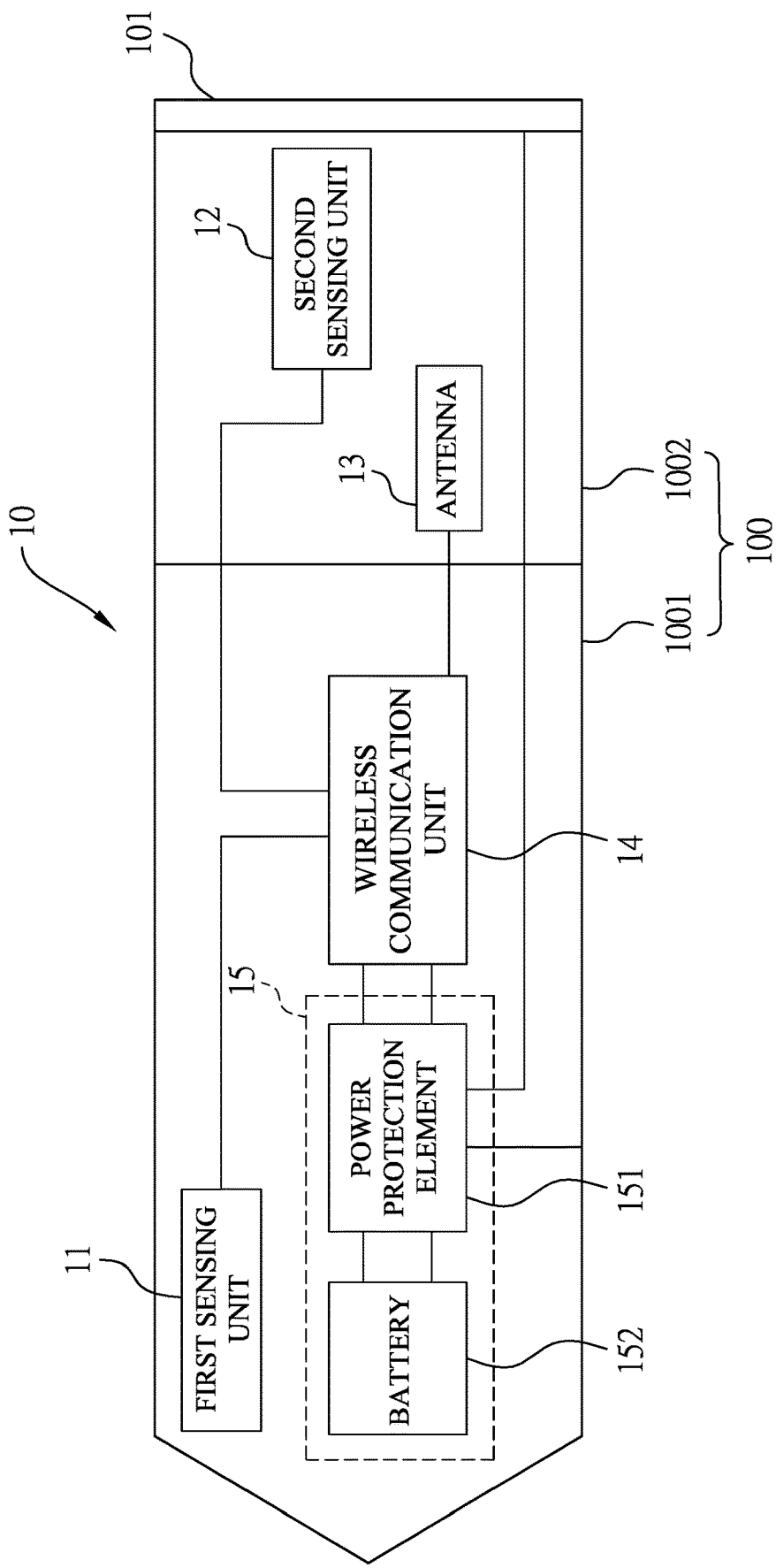
FIG. 2 is an exemplary layout of a thermometer of FIG. 1.

With reference to FIGS. 1 and 2, the present invention is a thermometer 10. The thermometer 10 includes a first sensing unit 11, a second sensing unit 12, an antenna 13, a wireless communication unit 14, and a battery unit 15.

Figure 3:
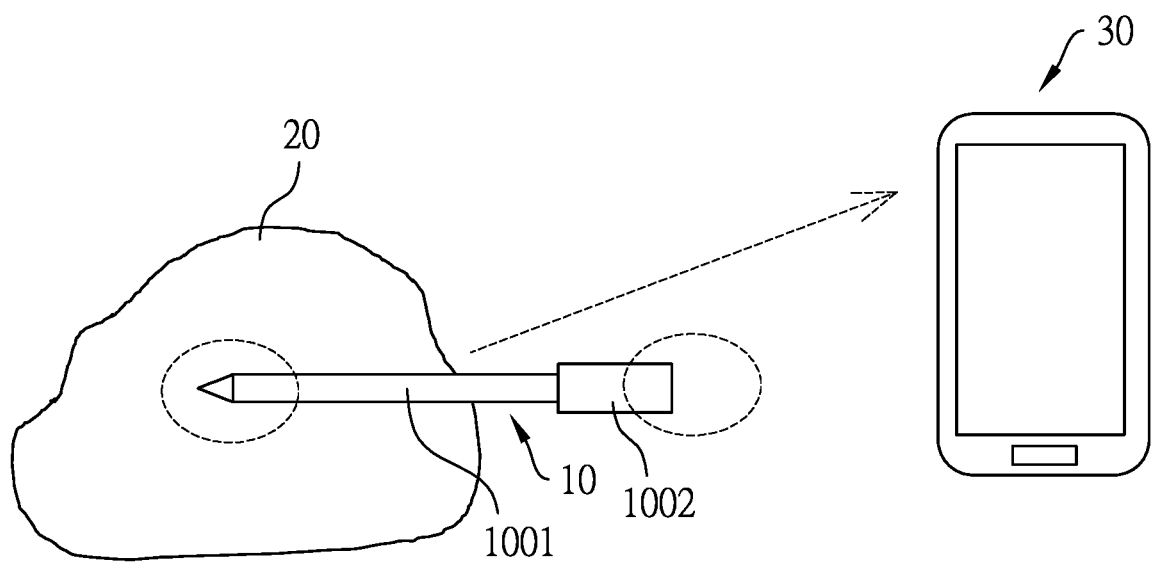
FIG. 3 is a schematic diagram of a first embodiment of a temperature monitoring system.

Further with reference to FIG. 3, in the embodiment, the monitored object is the food 20. The thermometer 10 is inserted into the food 20, and communicates with a first communication device 30.

The first sensing unit 11 is configured to sense an internal temperature of the monitored object to produce a first temperature value.

The second sensing unit 12 is configured to sense an ambient temperature external to the food 20 to produce a second temperature value.

The wireless communication unit 14 is configured to be electrically connected to the first sensing unit 11, the second sensing unit 12, and the antenna 13. The wireless communication unit 14 comprises a memory 141 storing a first previous temperature value and a second previous temperature value, and the wireless communication unit 14 counts a monitoring time at first. Further, the wireless communication unit 14 executes a measuring procedure to: load the first previous temperature value and the second pervious temperature from the memory 141; acquire the first temperature value and the second temperature value from the first sensing unit and the second sensing unit; determine whether a difference between the first temperature value and the first pervious temperature value exceeding a first threshold value or whether a difference between the second temperature value and the second pervious temperature value exceeding a second threshold value; produce and wirelessly broadcast a temperature information signal through the antenna when the difference between the first temperature value and the first previous temperature value exceeding the first threshold value or when the difference between the second temperature value and the second pervious temperature value exceeding the second threshold value; store the first temperature value and the second temperature value in the memory 141 to respectively replace the first previous temperature value and the second previous temperature value in the memory 141. In the embodiment, the temperature information signal includes temperature information, and the temperature information includes the first temperature value and the second temperature value.

The wireless communication unit 14 further executes a time interval producing procedure after the measuring procedure to: determine a time interval according to the monitoring time; determine whether the measuring procedure is terminated; when the measuring procedure is not terminated, execute the measuring procedure again after the time interval; when the measuring procedure is terminated, switch to a low power mode. In the embodiment, the wireless communication unit 14 is a BLE module. A temperature monitoring session established by the thermometer 10 includes the measuring procedure, and the time interval producing procedure.

The battery unit 15 is configured to be electrically connected to the wireless communication unit 14 to provide output voltage to the wireless communication unit 14.

Since the thermometer 10 may produce and wirelessly broadcast the temperature information signal through the antenna 13 when the difference between the first temperature value and the first previous temperature value exceeding the first threshold value or when the difference between the second temperature value and the second pervious temperature value exceeding the second threshold value, the first communication device 30 may continuously and wirelessly receive the temperature information from the thermometer 10 to monitor the temperature of the food 20.

Therefore, when the thermometer 10 is used in a closed cooking vessel, the user may remotely monitor the temperature of food 20 through the first communication device 30.

Another objective of the present invention is to provide the thermometer 10 using the battery unit 15 that can withstand high temperatures to power the thermometer 10. As such, the thermometer 10 can operate in a wide temperature range and be used to monitor the temperature of the food 20 when the food 20 is being cooked. For example, the thermometer 10 can operate in an environment with temperatures up to 250° C. and the monitored internal food temperature can be up to 100° C.

Further with reference to FIG. 1, the wireless communication unit 14 comprises the memory 141, a multiplexor (MUX) 142, an analog-to-digital converter (ADC) 143, a processor 144, and a transceiver 145. The multiplexor 142 is electrically connected to the first sensing unit 11 and the second sensing unit 12 to receive the first temperature value and the second temperature value. The multiplexor 142 is also electrically connected to the battery unit 15 to receive the output voltage of the battery unit 15. In the embodiment, the processor 144 may includes a timer to count the monitoring time.

The ADC 143 is connected to the multiplexor 142 to receive analog signals output by the multiplexor 142, and the ADC 143 converts the analog signals to digital signals.

The processor 144 is electrically connected to the memory 141, the multiplexor 142, and the ADC 143. The processor 144 receives the digital signals from the ADC 143, and controls the multiplexor 142 to select the first temperature value, the second temperature value or the output voltage of the battery unit 15 as the analog signals outputted to the ADC 143. The processor 144 may load the first previous temperature value and the second pervious temperature value from the memory 141.

The processor 144 is further electrically connected to the transceiver 145, and is electrically connected to the antenna 13 through the transceiver 145. The processor 144 produces and wirelessly broadcasts the temperature information signal through the transceiver 145 and the antenna 13. In the embodiment, the processor 144 executes a computer program to perform operations comprising the measuring procedure and the time interval producing procedure.

Figure 4:
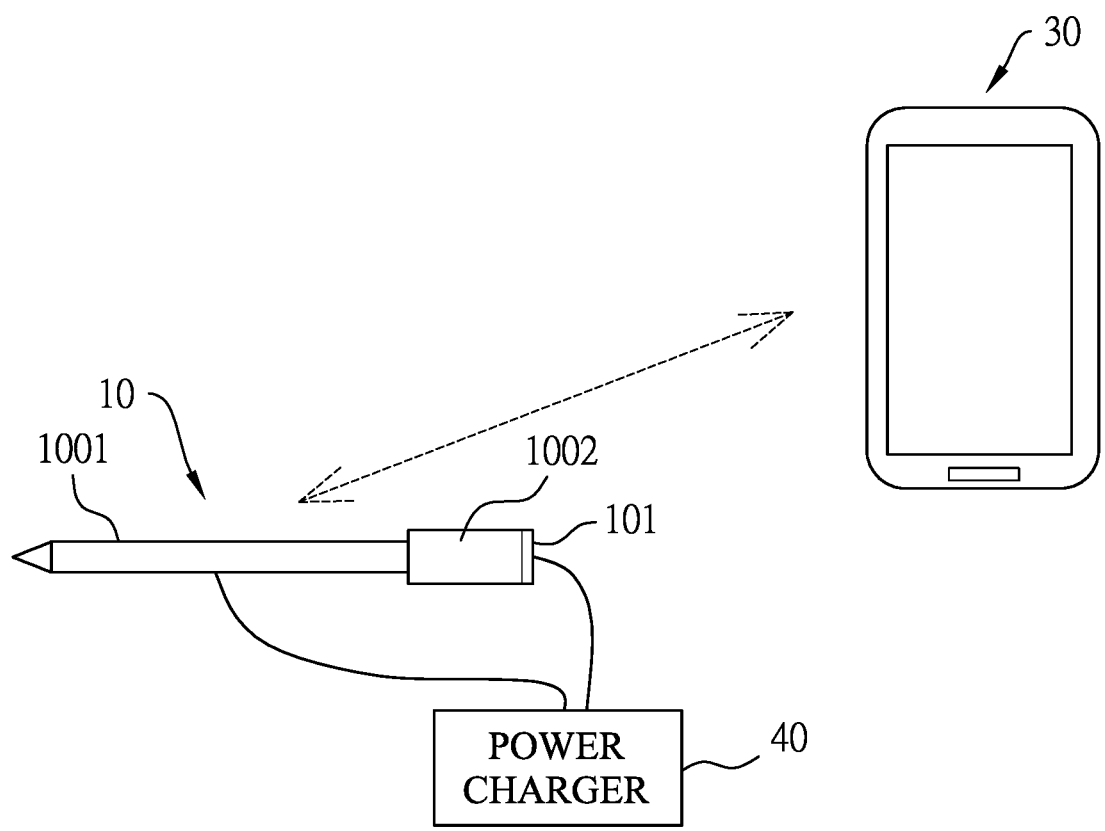
FIG. 4 is a schematic diagram of charging the thermometer of FIG. 2.

With reference to FIGS. 2, 3 and 4, the thermometer 10 further comprises a shell 100 and an electrode 101.

The shell 100 has an interior to contain a metal part 1001, which is a stainless steel tube with a tip at one end thereof that can be inserted into the food 20. The shell 100 is made of the metal part 1001 and an insulating part 1002. The insulating part 1002 is connected to an end of the metal part 1001 which is opposite to the tip.

The first sensing unit 11, the second sensing unit 12, the antenna 13, the wireless communication unit 14, and the battery unit 15 are mounted in the interior of the shell 100.

The electrode 101 is mounted on the insulating part 1002 of the shell 100 to be insulated from the metal part 1001.

Namely, the thermometer 10 is placed in a slim enclosure for easy insertion into the food 20.

All temperature-sensitive components of the thermometer 10 are placed in the metal part 1001 of the shell 100 and will be covered by part of the food 20 when used to monitor the food temperature. There are numerous ways for cooking food, and a wide range of cooking temperatures, mostly higher than the temperature-sensitive components can withstand, are set for different cooking methods. For example the cooking temperature of an oven may be as high as 250° C. This temperature will damage all electronic components. However, the temperature inside the food 20 is much lower than this ambient temperature, such as the cooking temperature. For example, to make delicious meat, it is required to keep the food temperature in a range from 60° C. to 95° C., depending on its preparation. Therefore, the temperature-sensitive components of the thermometer 10 can be prevented from damage if these components are placed inside the metal part 1001 of the shell 100 that is inserted into the food 20 when the food is being cooked. The temperature-sensitive components placed inside the metal part 1001 include the first sensing unit 11, the wireless communication unit 14, and the battery unit 15.

The battery unit 15 comprises a power protection element 151 and a battery 152. The power protection element 151 is electrically connected to the metal part 1001 of the shell 100 and the electrode 101, and the wireless communication unit 14 is electrically connected to the battery 152 through the power protection element 151.

The battery 152 is used as a power supply for the thermometer 10. The power protection element 151 is used to protect the battery 152 from being damaged by overcharging, excessive discharge, or excessive current drain.

The insulating part 1002 is used as a handle for easy insertion to and removal from the food 20, and is located outside the food 20 when the thermometer 10 is inserted into the food 20. The antenna 13 and the second sensing unit 12 can both withstand a much higher temperature and are placed in the insulating part 1002. In one embodiment, the insulating part 1002 may be made of a ceramic material. In another embodiment, the insulating part 1002 may be made of a heat resistant plastic.

The electrode 101 is used as a conductor for connecting a Vcc port of a power charger 40 to the battery unit 15 for charging the battery 152, and is attached to the insulating part 1002. When connecting the thermometer 10 to the power charger 40, the metal part 1001 contacts a grounding port of the power charger 40. By connecting the power protection element 151 to the electrode 101, the metal part 1001 and the battery 152, the power protection element 151 is actually operated as a bridge between the battery 152 and the power charger 40. The power protection element 151 also protects the battery 152 from being damaged by disconnecting the battery 152 when abnormal voltage or current drain is detected.

In order to extend battery life, the thermometer 10 is switched to a low power mode or sleep mode, in which power consumption is a few μW, when not in use. It is required to wake up the device to monitor the food temperature.

When connecting the thermometer 10 to the power charger 40, the power charger 40 starts charging the battery 152, which results in a voltage increase instantly at a terminal of the power protection unit 151. By detecting this voltage increase via the multiplexor 142 and the ADC 143, the processor 144 can be woken and start executing a communication setting procedure before the measuring procedure to receive a reference signal from the first communication device 30 via a BLE connection.

The processor 144 of the wireless communication unit 14 executes the communication setting procedure before the measuring procedure to: wirelessly broadcast a beacon signal; determine whether a pairing request is received; when the pairing request is received, determine whether an assigned identifier and a reference signal are received; when the assigned identifier and the reference signal are received, execute the measuring procedure. In the embodiment, a communication session established by the thermometer 10 includes the communication setting procedure.

For example, the processor 144 instructs the transceiver 145 to transmit the beacon signal, and the first communication device 30 detects the beacon signal indicating existence of the thermometer 10 and thereafter sends the pairing request to the thermometer 10. After receiving the pairing request from the first communication device 30, the processor 144 stops transmitting the beacon signal, and begins a pairing process with the first communication device 30. During the pairing process, the first communication device 30 sends an assigned identifier and a reference signal to the thermometer 10. The assigned identifier is the identification of the thermometer 10 and will be included in every signal transmitted by the thermometer 10. The reference signal comprises the cooking information to be used for operation of the thermometer 10 to ensure that power consumption can be reduced to extend operating time during a cooking process. The cooking information is programmable via the first communication device 30 and may be related to a food type and a cooking method of the food 20. In one embodiment, the cooking information may include a target temperature value of the food, a desired temperature of the cooking vessel, and a reference finish time. The reference finish time is the time required for cooking the food 20 to the target temperature value. The cooking information may be manually set by the user via the software program being executed on the first communication device 30. In another embodiment, the cooking information may be selected from a database in which a plurality of recipes is stored. After receiving the reference signal, the processor 144 ends the communication setting procedure and starts the temperature monitoring session.

In particular, after completion of the communication setting procedure, the processor 144 performs the measuring procedure and the time interval producing procedure to repeatedly measure temperature of the food 20 and transmit the temperature information signal.

Furthermore, as described above, it is desired to keep power consumption during the cooking process as low as possible to extend the battery life. This objective can be achieved by keeping the operation time of the wireless communication unit 14 as short as possible and keeping the wireless communication unit 14 in the low power mode during most of the cooking process. The wireless communication unit 14 may drain current at the level of only a few μA when staying in the low power mode.

With reference to FIG. 3, a first embodiment of the temperature monitoring system includes the thermometer 10 and the first communication device 30. When the thermometer 10 is inserted into the food 20 to be cooked, the thermometer 10 measures the internal temperature of the food 20 and the ambient temperature external to the food 20. The thermometer 10 transmits the temperature information signal via BLE protocol. A nearby BLE-capable first communication device 30 receives the temperature information signal and acquires the temperature data for monitoring the temperature of the food 20 being cooked. In an embodiment, the temperature information signal may be an iBeacon signal such that multiple iBeacon-compatible communication devices nearby may receive the temperature data simultaneously and directly from the thermometer 10.

The line-of-sight propagation range of a BLE signal is limited to about 10 meters, and may be reduced to a shorter range if the food 20 is cooked in an enclosed cooking vessel such as an oven, a BBQ grill, or a smoker. It is desired to extend the wireless connection range so the user can monitor the food temperature from a further distance.

Figure 5:
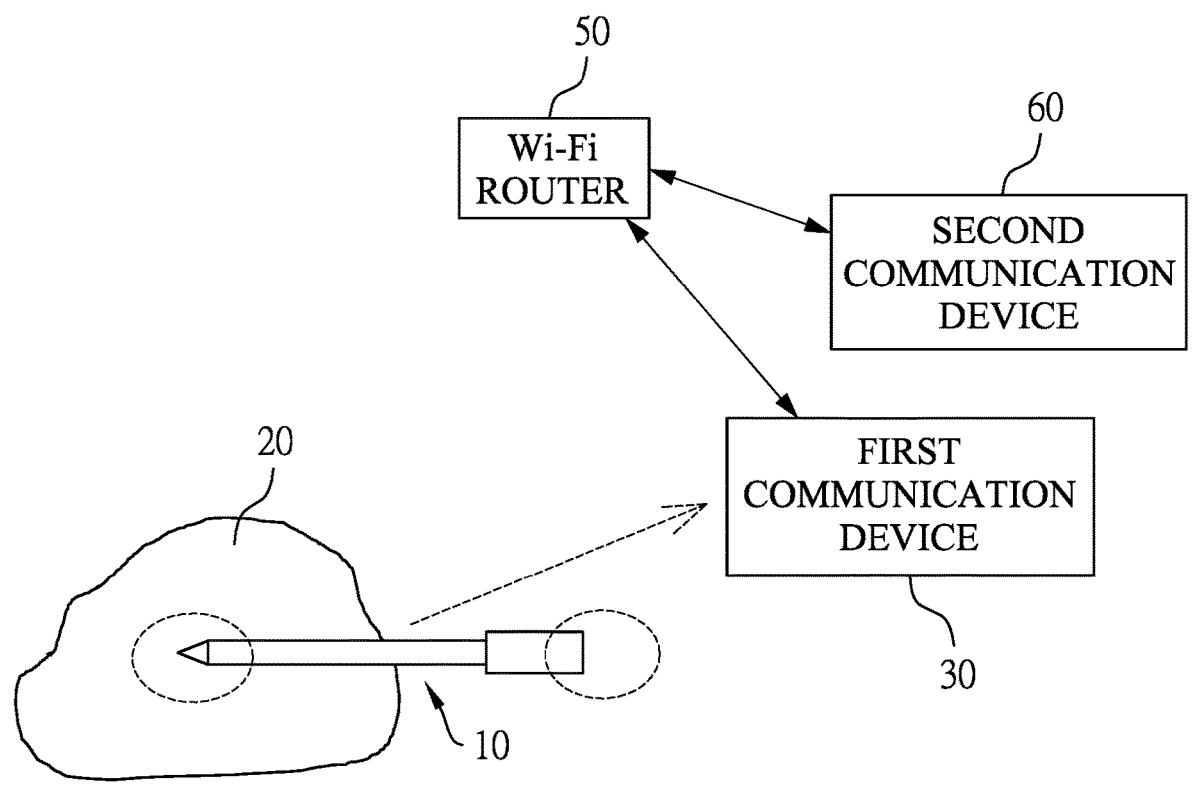
FIG. 5 is a schematic diagram of a second embodiment of the temperature monitoring system.

With reference to FIG. 5, a second embodiment of the temperature monitoring system further includes a Wi-Fi router 50, and a second communication device 60. The first communication device 30 is placed in proximity to the thermometer 10 and is wirelessly connected to the Wi-Fi router 50. The first communication device 30 receives the BLE signal comprising the temperature data and stores it in a memory of the first communication device 30. One may use the second communication device 60 that is within the coverage range of the Wi-Fi router 50 to monitor the food temperature. In this case, the second communication device 60 may establish a Wi-Fi connection to the Wi-Fi router 50 which may connect to the first communication device 30 to acquire the temperature data. The second communication device 60 may be a smartphone or tablet computer. The food temperature is indicated by the first temperature value.

Figure 6:
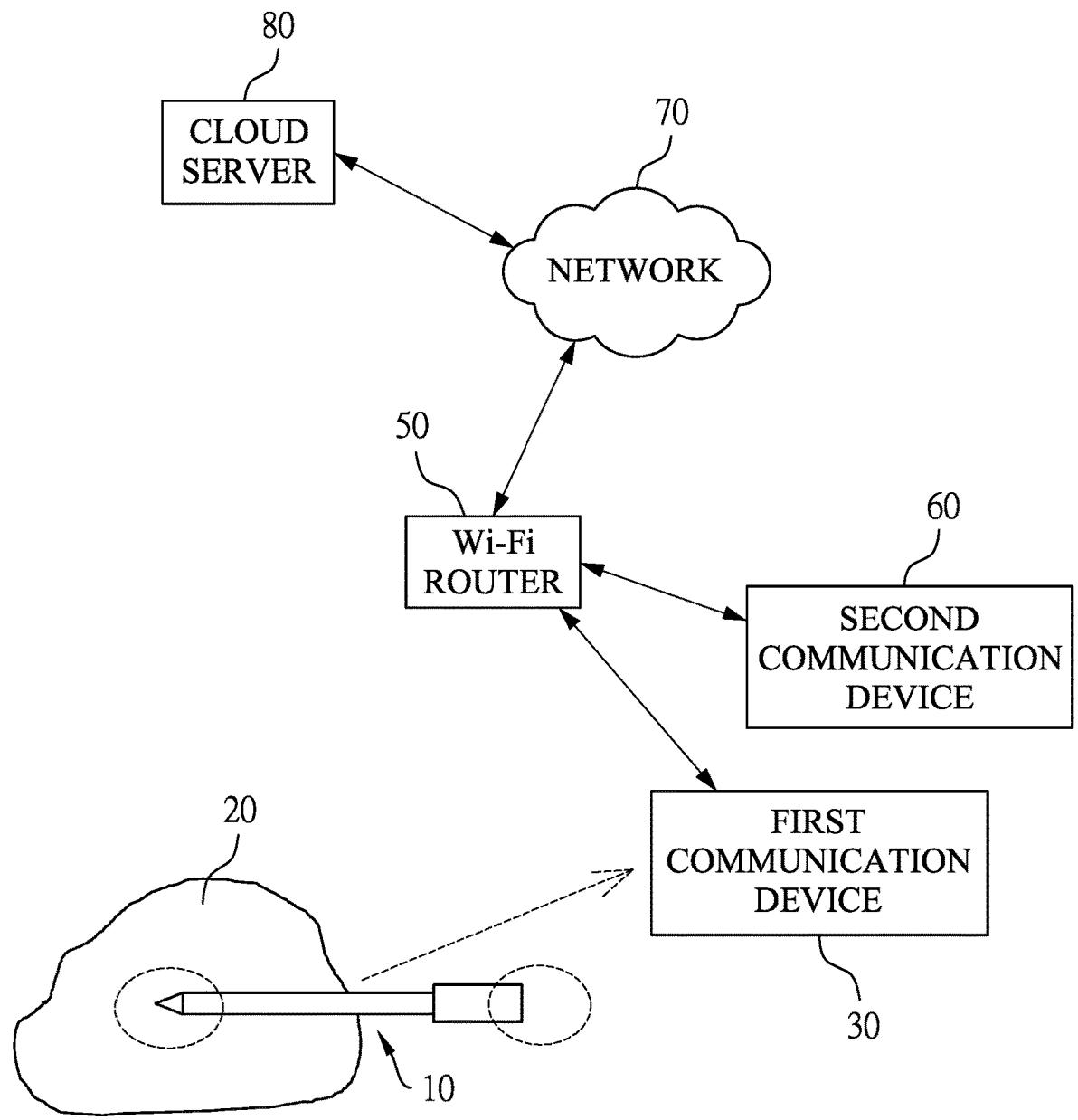
FIG. 6 is a schematic diagram of a third embodiment of the temperature monitoring system.

With reference to FIG. 6, a third embodiment of the temperature monitoring system further includes a cloud server 80. The first communication device 30 may communicate with the cloud server 80 via the Wi-Fi router 50 and a network 70. The first communication device 30 is in proximity to the thermometer 10 and the second communication device 60 is located within a coverage range of the Wi-Fi router 50. The network 70 is any suitable network for enabling communications between various entities, such as between the first communication device 30 and the cloud server 80. The network 70 may include, for example a local area network, a wide-area network, a virtual private network, the Internet, a public switched telephone network, a wireless network, a cellular network, or any other such network or combination thereof. The first communication device 30 receives the BLE signal comprising the temperature data and stores the temperature data in its memory. The second communication device 60 may connect to the first communication device 30 via the Wi-Fi router 50 to acquire the temperature data. When the first temperature value reaches the target temperature value, the first communication device 30 sends a notification signal (not shown) to the cloud server 80 via the Wi-Fi router 50 and the network 70. The cloud server 80 further sends the notification signal (not shown) to the second communication device 60.

Furthermore, the food may continuously heat up to a certain degree after the food 20 is removed from the cooking vessel (not shown) as residual heat will transfer from the hotter exterior of the food to the cooler center. In other words, the internal food temperature will rise after the food 20 is removed from the cooking vessel due to carryover cooking. It is recommended to remove the food from the cooking vessel at an internal temperature lower than the desired target temperature value, allowing the residual heat to finish the cooking process. It is therefore desirable to receive a notification when the first temperature value reaches a particular temperature value, called a warning temperature value, which is lower than the target temperature value. Ideally, removing the food 20 from the cooking vessel when the first temperature value reaches the warning temperature value will allow the food 20 to continue to heat up and allow the first temperature value to rise to (or close to) the target temperature value. This particular temperature value may be included in the cooking information of the reference signal and is programmable from the first communication device 30. The warning temperature value may be determined based on a specific recipe, cooking experience, and may be closely related to the cooking temperature, type of food, size of food, and the like. In the embodiment, the warning temperature value is included in the cooking information.

Figure 7:
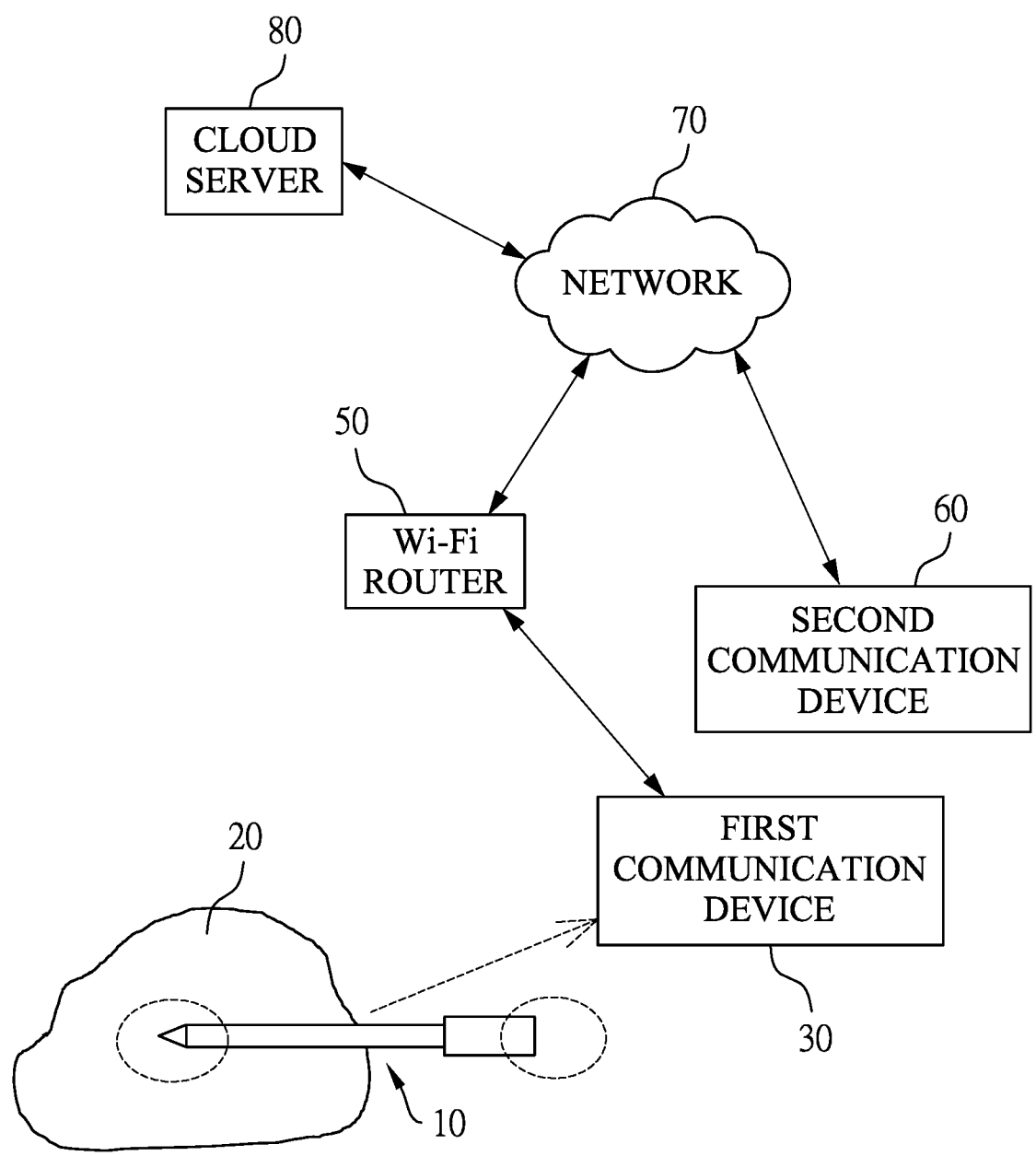
FIG. 7 is a schematic diagram of a fourth embodiment of the temperature monitoring system.

With reference to FIG. 7, a fourth embodiment of the temperature monitoring system is further desirable to monitor the food temperature from a remote location. For instance, the user may be away from the cooking site while the food 20 is being cooked in a cooking vessel. The first communication device 30 is placed in proximity to the thermometer 10 and sends received temperature data to the cloud server 80 via a Wi-Fi network, a Wi-Fi router 50, and a network 70. The second communication device 60 is out of the coverage range of the Wi-Fi router 50 and is connected to the cloud server 80 via the network 70. Through the network 70, the second communication device 60 acquires the temperature data and receives a notification indicating that the first temperature value has reached a particular temperature value (the warning temperature value and/or the target temperature value), both from the cloud server 80.

Figure 8:
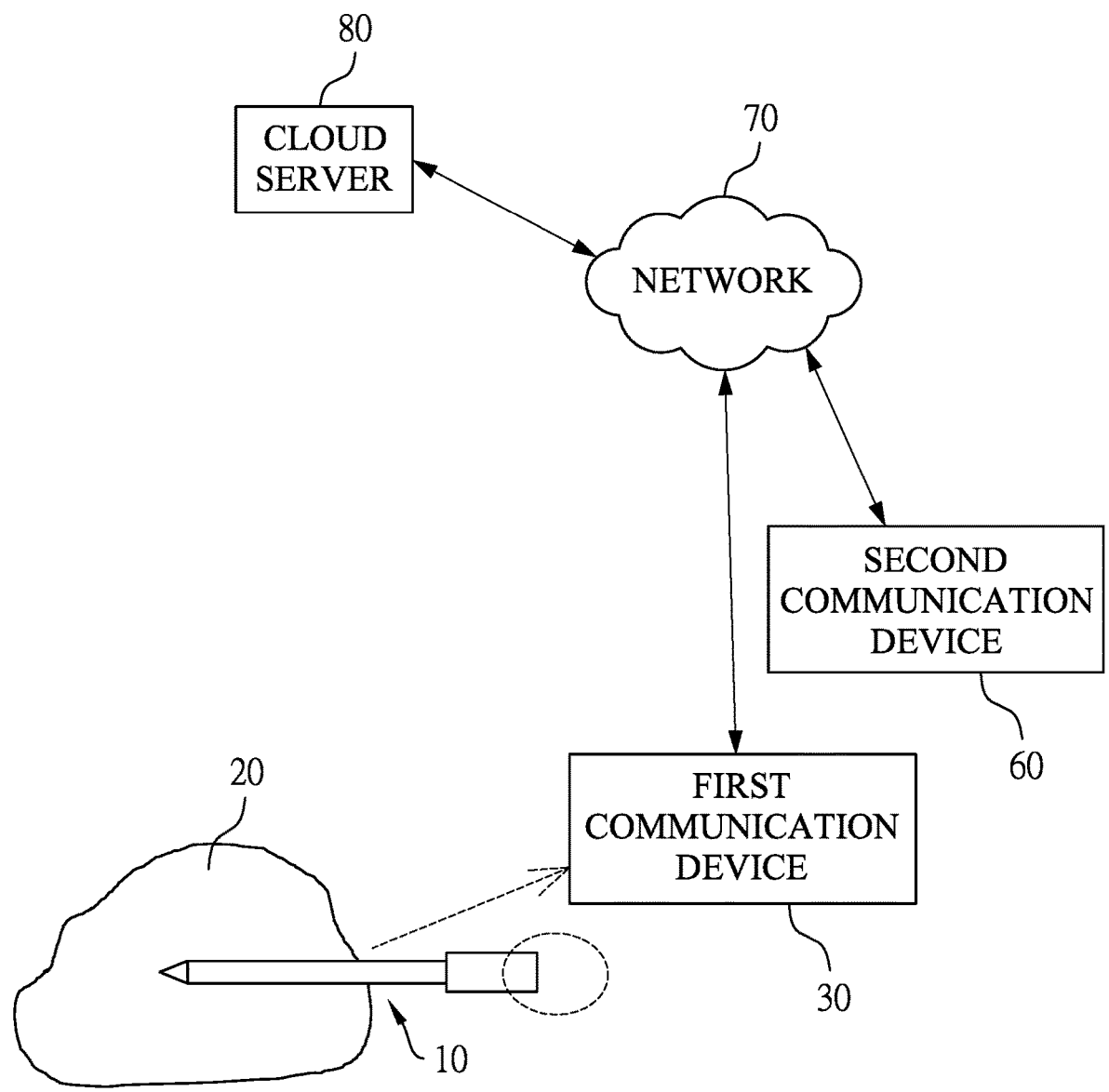
FIG. 8 is a schematic diagram of a fifth embodiment of the temperature monitoring system.

With reference to FIG. 8, a fifth embodiment of the temperature monitoring system may be desirable to cook food outdoors where Wi-Fi connection is not available. The first communication device 30 uses a cellular technology to communicate with the cloud server 80 via a network 70 and sends temperature data to the cloud server 80. In this case, by connecting the second communication device 60 to the cloud server 80 via the network 70 and acquiring the temperature data, the user can monitor the food temperature from any location out of the signal coverage range of the thermometer 10.

The first communication device 30 as illustrated in FIG. 5 to FIG. 8 is operated as a signal repeater. When the first communication device 30 is operated as the signal repeater, the first communication device 30 receives the temperature data transmitted from the thermometer 10 and stores it in the memory. One may use a second communication device 60 to communicate with the first communication device 30 and acquire temperature data, as illustrated in FIG. 5 and FIG. 6. The first communication device 30 may connect to the cloud server 80 and forward the temperature data to the cloud server 80 as illustrated in FIG. 7 and FIG. 8. One may then use the second communication device 60 to acquire temperature data from the cloud server 80. The first communication device 30 may further send a first notification signal (not shown) to the cloud server 80 when the received first temperature value reaches the warning temperature value, and a second notification signal (not shown) to the cloud server 80 when the received first temperature value reaches the target temperature value. The cloud server 80 may then send a corresponding notification signal (not shown) to the second communication device 60.

Further, The first communication device 30 may further send a third notification signal (not shown) to the cloud server 80 when the received ambient temperature meets one of the abnormal conditions specified in the cooking information. The abnormal conditions may include a first abnormal temperature value and a second abnormal temperature value. The second abnormal temperature value is greater than the first the abnormal temperature value. The ambient temperature is indicated by the second temperature value. Therefore, when the received second temperature value gradually decreases below the first abnormal temperature value or exceeds the second abnormal temperature value, a notification received at the second communication device 60 may alert the user to adjust the cooking vessel to be operated in the desired temperature range to ensure that the food is cooked by the preferable cooking process.

In the above exemplary embodiments, the second communication device 60 may be moved to a location where the broadcasted temperature information signal may be received. When receiving the temperature information signal directly from the thermometer 10, the second communication device 60 acquires the temperature data and further sends the temperature data to the first communication device 30, disregarding that the first communication device 30 may also receive the temperature information signal.

Figure 9:
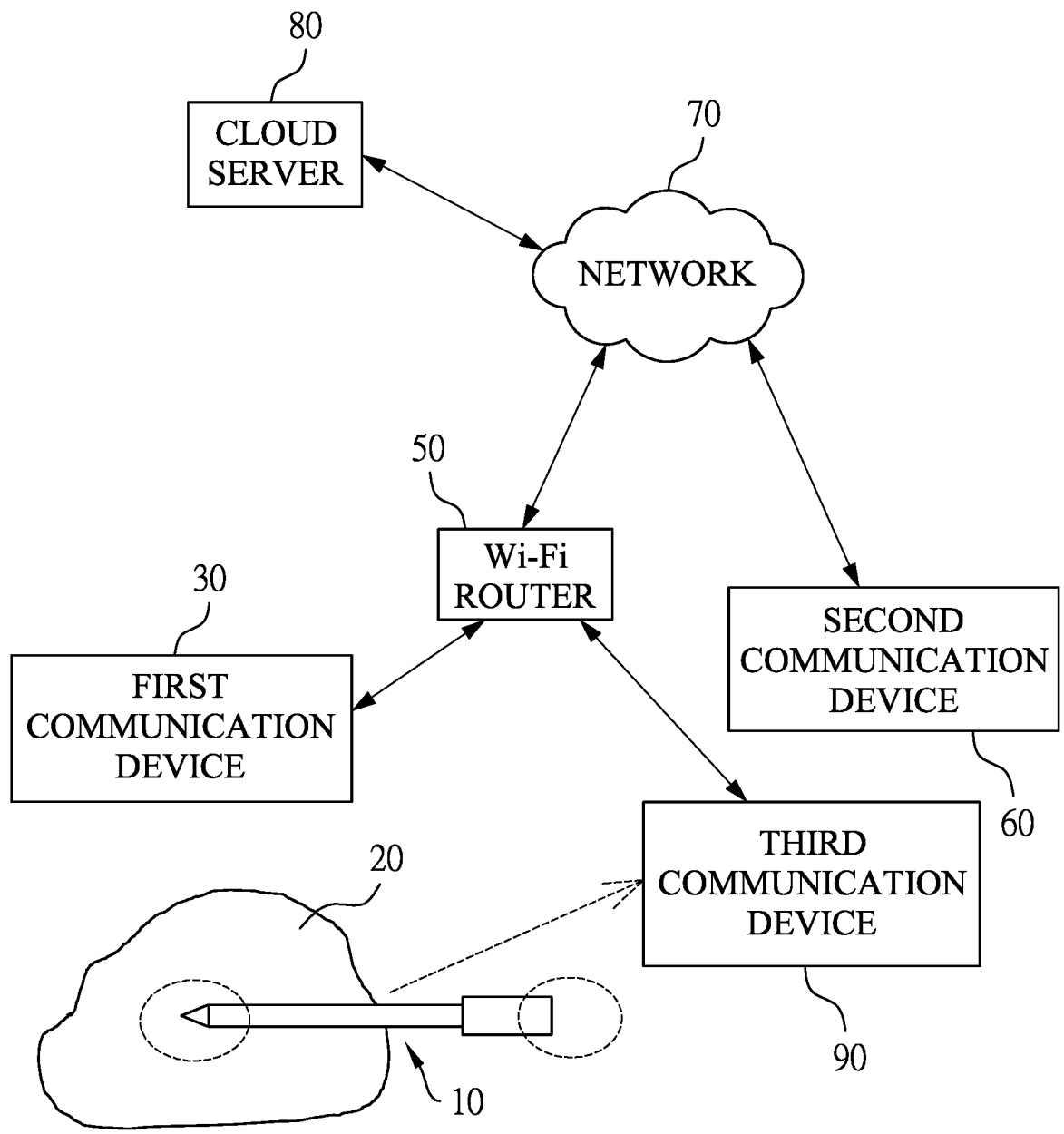
FIG. 9 is a schematic diagram of a sixth embodiment of the temperature monitoring system.

With reference to FIG. 9, a sixth embodiment of the temperature monitoring system further includes a third communication device 90. The third communication device 90 may be provided as the signal repeater. The third communication device 90 is a BLE and Wi-Fi capable device. The third communication device 90 is located in proximity to the thermometer 10 and connects to a Wi-Fi router 50 via Wi-Fi connection. The first communication device 30 communicates with the third communication device 90 via Wi-Fi connection and the Wi-Fi router 50, and sends the preprogrammed cooking information to the third communication device 90. Then the third communication device 90 receives temperature data transmitted from the thermometer 10 and forwards temperature data to the cloud server 80 via the Wi-Fi router 50. The third communication device 90 may further send a first notification signal (not shown) to the cloud server 80 when the received first temperature value reaches a predetermined warning temperature value, a second notification signal (not shown) to the cloud server 80 when the received first temperature value reaches the target temperature, and a third notification signal (not shown) to the cloud server 80 when the received ambient temperature meets one of the abnormal conditions specified in the cooking information as described above. The cloud server 80 may then send a corresponding notification signal (not shown) to the first communication device 30 and the second communication device 60. The second communication device 60 may acquire the temperature data from the third communication device 90 via the Wi-Fi router 50 when it is within the coverage range of the Wi-Fi router 50. The second communication device 60 may acquire temperature data from the cloud server 80 via the network 70 when it is out of the coverage range of the Wi-Fi router 50. The second communication device 60 may receive the temperature information signal and acquire temperature data when it is moved in proximity to the thermometer 10. When this happens, the second communication device 60 may further send temperature data to the third communication device 90.

It is another objective of the present invention to provide a temperature monitoring method executed by the thermometer 10 to reduce power consumption.

Figure 10:
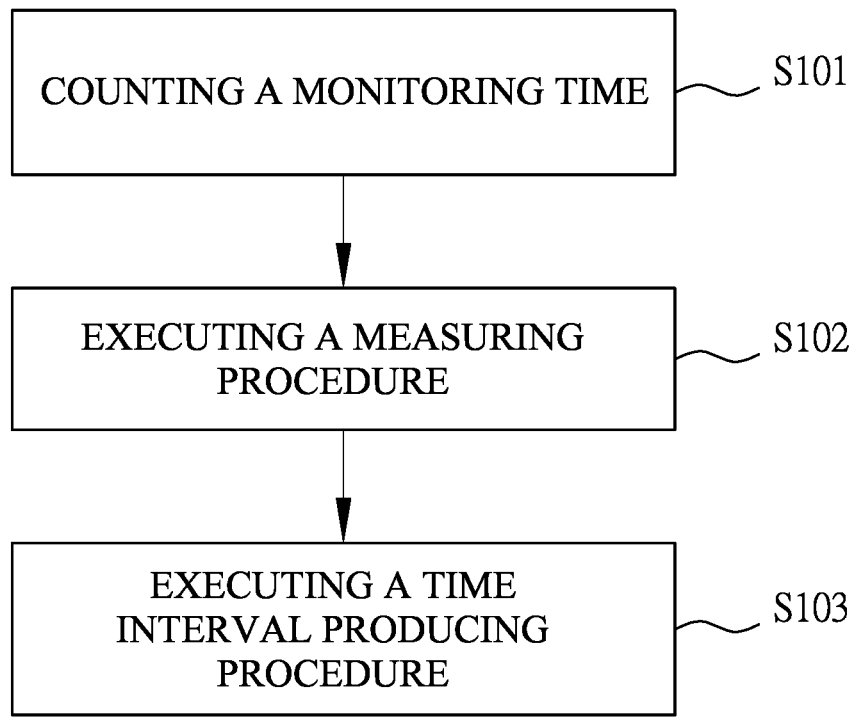
FIG. 10 is a flowchart of an embodiment of a temperature monitoring method.

With reference to FIG. 10, the temperature monitoring method comprises the steps of:

counting a monitoring time (S101);

executing a measuring procedure (S102);

executing a time interval producing procedure after the measuring procedure (S103).

Figure 11:
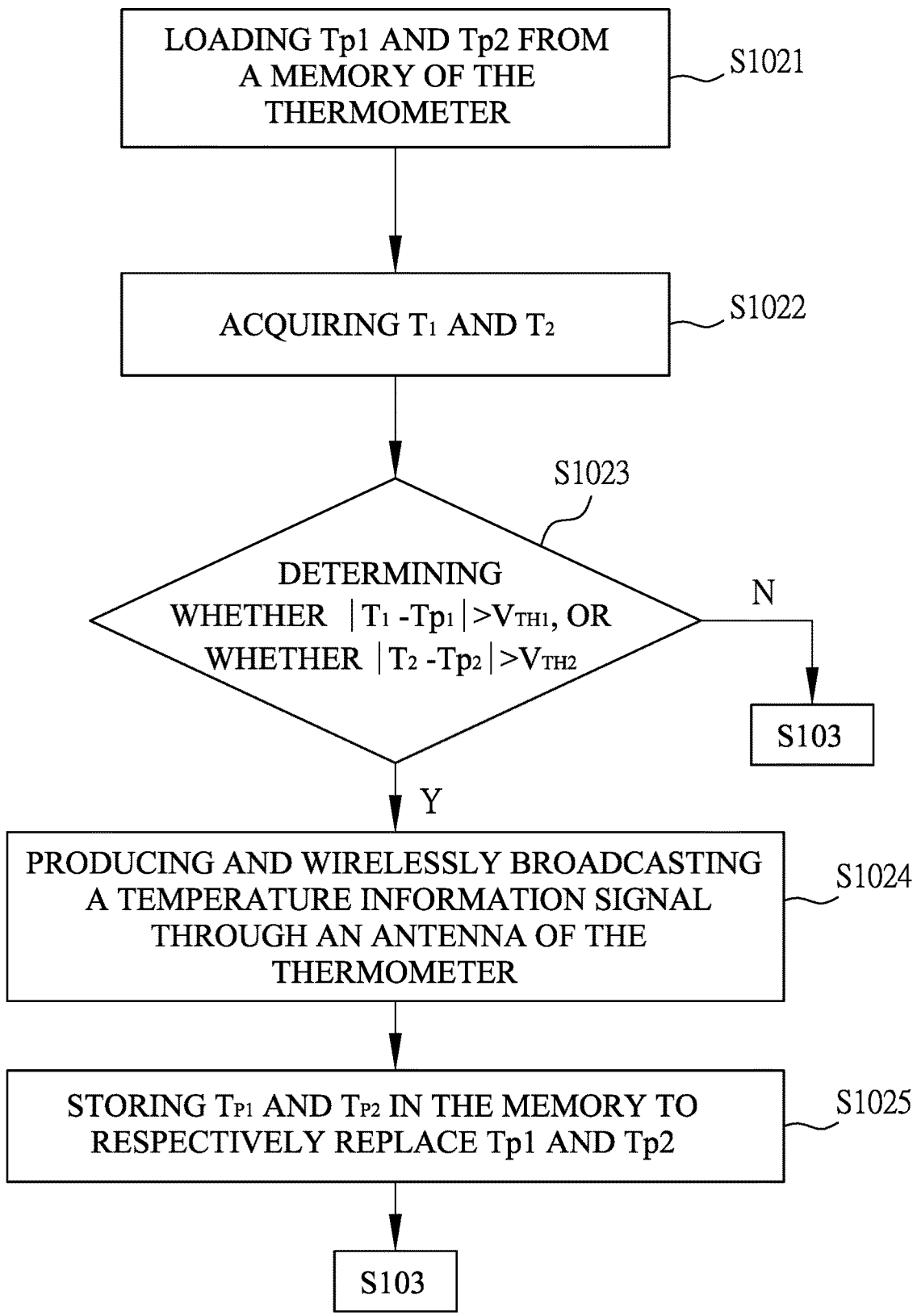
FIG. 11 is a flowchart of an embodiment of a measuring procedure of the temperature monitoring method.

With reference to FIG. 11, the measuring procedure comprises the steps of:

loading a first previous temperature value $T_{p1}$ and a second pervious temperature value $T_{p2}$ from a memory of the thermometer (S1021);

acquiring a first temperature value $T_1$ and a second temperature value $T_2$ (S1022);

when the first temperature value $T_1$ and the second temperature value $T_2$ are received, determining whether the difference between the first temperature value $T_1$ and the first previous temperature value $T_{p1}$ exceeds the first threshold value $V_{TH1}$, or whether the difference between the second temperature value $T_2$ and the second pervious temperature value $T_{p2}$ exceeds the second threshold value $V_{TH2}$ (S1023), if the result is true, proceeding to step S1024, otherwise exiting the measuring procedure and executing the time interval producing procedure (S103);

producing and wirelessly broadcasting a temperature information signal through an antenna of the thermometer when the difference between the first temperature value and the first previous temperature value exceeds the first threshold value or when the difference between the second temperature value and the second pervious temperature exceeds the second threshold value (S1024);

storing the first temperature value and the second temperature value in the memory to respectively replace the first previous temperature value and the second previous temperature value (S1025), and then executing the time interval producing procedure (S103).

Figure 12:
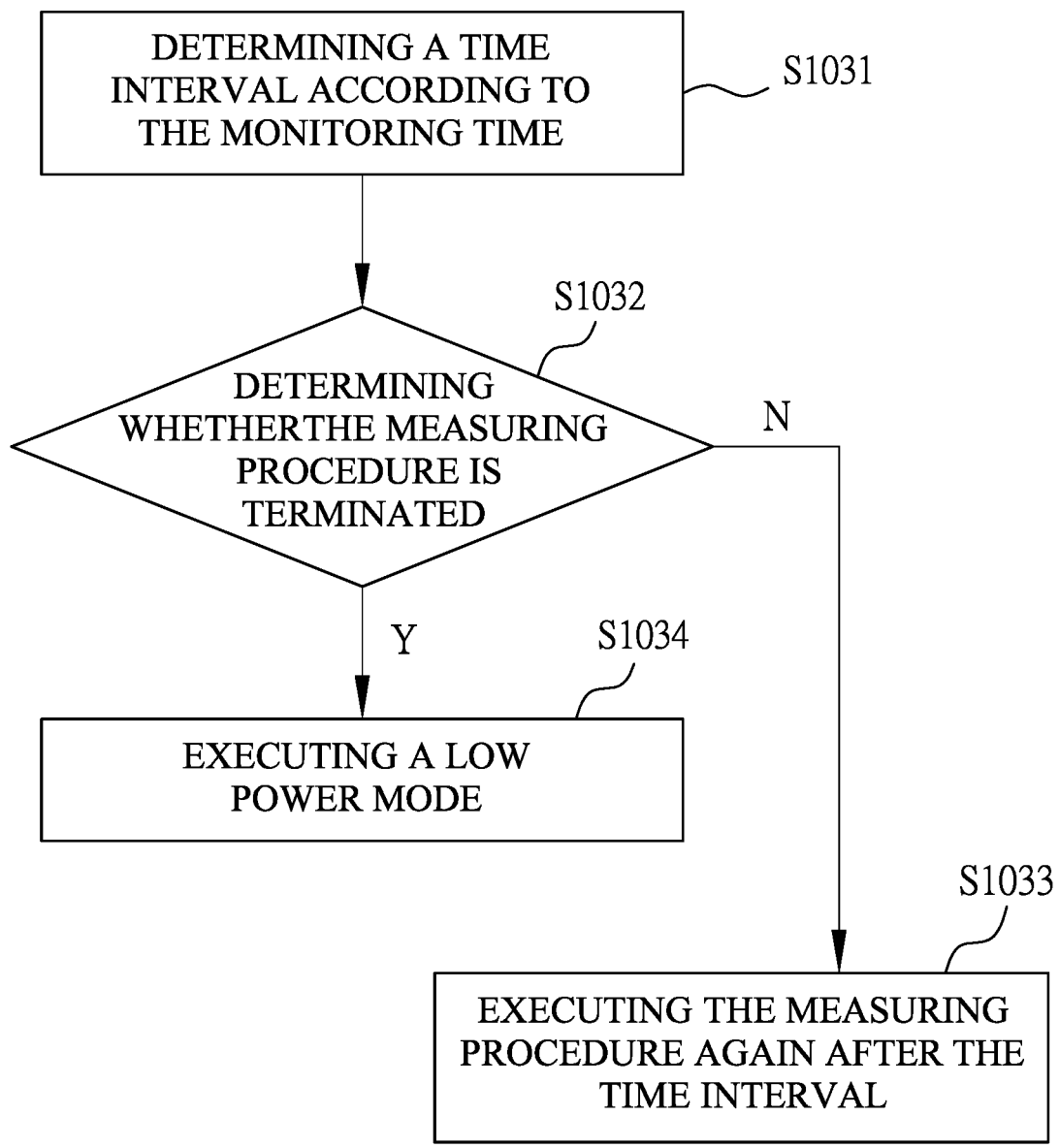
FIG. 12 is a flowchart of an embodiment of a time interval producing procedure of the temperature monitoring method.

With reference to FIG. 12, the time interval producing procedure comprises the steps of:

determining a time interval according to the monitoring time (S1031); and determining whether the measuring procedure is terminated (S1032);

when the measuring procedure is not terminated, executing the measuring procedure again after the time interval (S1033);

when the measuring procedure is terminated, executing a low power mode (S1034).

Figure 13:
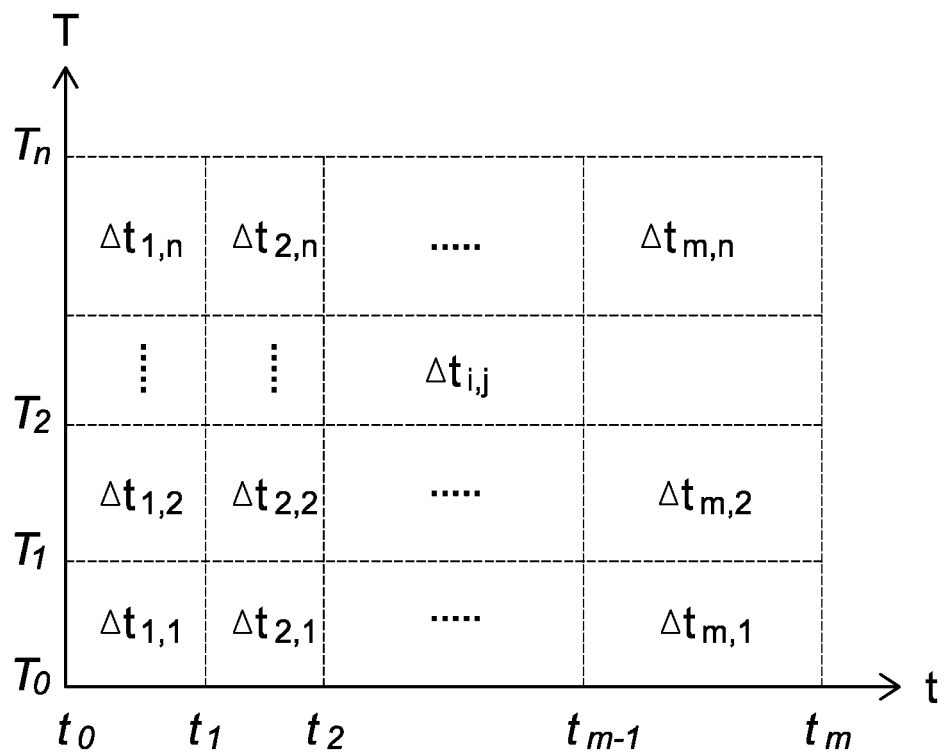
FIG. 13 is a diagrammatic example of determining the time interval between two consecutive temperature measurements.

In an exemplary embodiment, the time interval is the time between two temperature measurements, and the time interval is determined by the monitoring time and the second temperature value. With reference to FIG. 13, the time interval Δt is determined by:

$$\Delta t = \Delta t_{ij} \text{ when } T_{j-1} < T_2(t_c) \leq T_j \text{ and } t_{i-1} < t_c \leq t_i$$

wherein $T_2(t_c)$ is the second temperature value measured and broadcasted at a current time or monitoring time $t_c$, $1 \leq i \leq n$, and $t_0$ is the starting time of the temperature monitoring session. Wherein $t_i$ is a predetermined time instant and $T_j$ is a predetermined temperature value. Further, $\Delta t_{ij}$ is a predetermined constant corresponding to the time period $(t_{i-1}, t_i)$ and the temperature range $(T_{j-1}, T_j)$, and is stored in memory 141. In one embodiment, $t_m$ is set to a long cooking time, such as 100 hours, $T_0$ is set to a low ambient temperature, such as 0° C., and $T_n$ is the highest ambient temperature that the antenna 13 and the second sensing unit 12 of the thermometer 10 can withstand, such as 300° C.

In step 1032, the thermometer 10 determines whether to end the measuring procedure and switch to the low power mode. In one embodiment, the measuring procedure is terminated when the second temperature value gradually drops below a predetermined temperature for a first predetermined time period after the first temperature value exceeding the target temperature value.

In another embodiment, the measuring procedure is teminated when the second temperature value gradually drops below a predetermined temperature for a second predetermined time period after the first temperature value exceeding the warning temperature value.

It is desired to provide estimation of the finish time or the remaining time of the cooking process so the user can be standby when the first temperature value is close to the target temperature or warning temperature.

Figure 14:
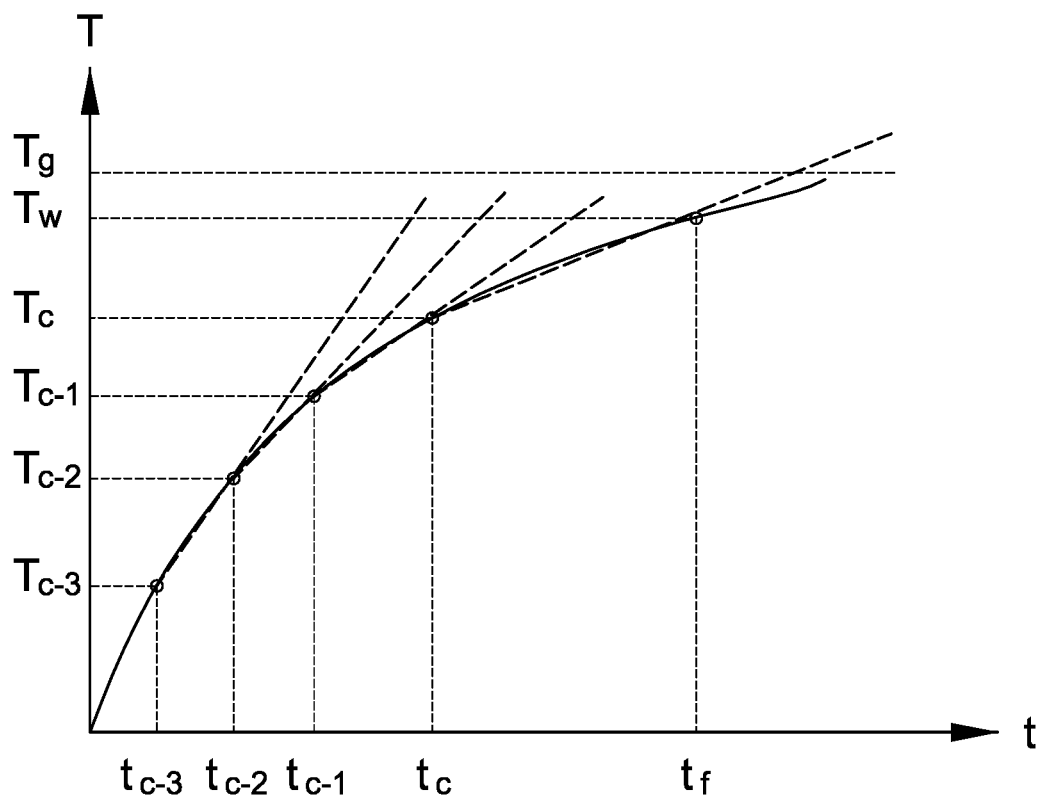
FIG. 14 is a schematic diagram of a temperature curve of a cooking food.

With reference to FIG. 14, FIG. 14 shows a temperature curve for a particular food during a cooking process, wherein $T_c$ denotes the current first temperature value measured and transmitted at time $t_c$, $T_{c-1}$ denotes the previous first temperature value measured and transmitted at $t_{c-1}$, $T_{c-2}$ denotes the previous first temperature value measured and transmitted at $t_{c-2}$, and so forth. The temperature change rate $r_c$ at time $t_c$ can be approximated by:

$$r_c = \frac{T_c - T_{c-1}}{t_c - t_{c-1}};$$

Similarly, the temperature change rate at $t_{c-1}$ can be approximated by:

$$r_{c-i} = \frac{T_{c-i} - T_{c-1-i}}{t_{c-i} - t_{c-1-i}};$$

For simplicity of description, $r_c$ may be denoted as the current temperature change rate, and $r_{c-1}, r_{c-2}, r_{c-3}$, etc. refer to the previous temperature change rates. According to the principle of heat transfer and the thermophysical property of the food item (specifically meat), during a cooking process the temperature change rate of the inner portion of the food gradually decreases, namely, $$0 \leq r_c \leq r_{c-1} \leq r_{c-2} \leq r_{c-3} \leq \ldots;$$

Consequently, there exists an offset value $\varepsilon_i$ corresponding to $r_{c-i}$ and $r_{c-i+1}$ as:

$$\varepsilon_i = r_{c-i} - r_{c-i+1};$$

With reference to FIG. 14, the finish time $t_f$ and the remaining time $t_{remaining}$ can be computed by the following formula:

$$t_f = t_c + \frac{(T_g - T_c)}{r};$$

$$t_{remaining} = t_f - t_c;$$

The formula for determining $t_f$ requires a value of r, where $r \leq r_c$ and may be estimated according to the current temperature change rate $r_c$, a weighting factor $\alpha$ and an offset value $\varepsilon$ as:

$$r = \begin{cases} \alpha \times r_c - \varepsilon, & \text{when } \alpha \times r_c - \varepsilon > 0 \\ \alpha \times r_c, & \text{when } \alpha \times r_c - \varepsilon \leq 0 \end{cases};$$

where the weighting factor $\alpha$ is derived according to the current first temperature value $T_c$, the target temperature value $T_g$ and the desired temperature of the cooking vessel $T_{air}$. In one embodiment, when $T_{air} > 150°$ C. or $T_c \geq T_c - 10°$ C., $\alpha = 1$; otherwise, $\alpha$ is given by:

$$\alpha = \frac{(T_{air} - T_g)}{T_{air}} + \left(\beta_1 - \frac{(T_{air} - T_g)}{T_{air}}\right) \times \frac{(T_c - \beta_2)}{(T_g - \beta_3)};$$

where $\beta_1$, $\beta_2$ and $\beta_3$ are constant values.

Further, the offset value $\varepsilon$ may be estimated according to a plurality of the previous offset values $\varepsilon_i$, or a plurality of the previous temperature change rates, such as:

$$\varepsilon = \frac{1}{h} \times \left(\sum_{i=1}^{h} (r_{c-i} - r_{c-i+1})\right);$$

wherein h is a predetermined integer, and $r_{c-i}$ is temperature change rate at the time $t_{c-i}$.

In another embodiment, h may further be determined in accordance with the preprogrammed cooking information which includes the desired temperature of the cooking vessel and type of food. For example, set h=3 when roasting beef with an oven in a temperature range from 160° C. to 175° C., and set h=5 when smoking fish in a smoker in a temperature range from 107° C. to 115° C.

The estimated finish time stated above may be performed by the first communication device 30, the third communication device 90, the second communication device 60, or combinations thereof

What is claimed is:

1. A thermometer, comprising:
   a first sensing unit configured to sense an internal temperature of a monitored object to produce a first temperature value;
   a second sensing unit configured to sense an ambient temperature external to the monitored object to produce a second temperature value;
   an antenna;
   a wireless communication unit configured to be electrically connected to the first sensing unit, the second sensing unit, and the antenna, wherein the wireless communication unit comprises a memory storing a first previous temperature value and a second previous temperature value, wherein the wireless communication unit counts a monitoring time at first, and executes a measuring procedure to:
load the first previous temperature value and the second pervious temperature from the memory;
acquire the first temperature value and the second temperature value from the first sensing unit and the second sensing unit;
produce and wirelessly broadcast a temperature information signal when a difference between the first temperature value and the first previous temperature value exceeds a first threshold value or when a difference between the second temperature value and the second pervious temperature exceeds a second threshold value, otherwise exit the measuring procedure;
after broadcasting the temperature information signal, store the first temperature value and the second temperature value in the memory to respectively replace the first previous temperature value and the second previous temperature value in the memory, and then exit the measuring procedure;
wherein the wireless communication unit executes a time interval producing procedure after the measuring procedure to:
determine a time interval according to the monitoring time and the second temperature value; and
determine whether the measuring procedure is terminated;
when the measuring procedure is not terminated, execute the measuring procedure again after the time interval; and
when the measuring procedure is terminated, switch to a low power mode; and
a battery unit configured to be electrically connected to the wireless communication unit to provide an output voltage to the wireless communication unit;
wherein the temperature information signal comprises temperature information, and the temperature information comprises the first temperature value and the second temperature value.

2. The thermometer as claimed in claim 1, wherein the wireless communication unit further comprises:
a multiplexor configured to be electrically connected to the first sensing unit and the second sensing unit to receive the first temperature value and the second temperature value, wherein the multiplexor is further electrically connected to the battery unit to receive the output voltage of the battery unit;
an analog-to-digital converter (ADC) configured to be electrically connected to the multiplexor to receive analog signals output by the multiplexor, wherein the ADC converts the analog signals to digital signals;
a processor configured to be electrically connected to the ADC to receive the digital signals, wherein the processor is further electrically connected to the multiplexor to control the multiplexor to select the first temperature value, the second temperature value or the output voltage of the battery unit as the analog signals outputted to the ADC, wherein the processor is electrically connected to the memory to load the first previous temperature value and the second pervious temperature value;

a transceiver configured to be electrically connected between the processor and the antenna, wherein the processor produces and wirelessly broadcasts the temperature information signal through the transceiver and the antenna.

3. The thermometer as claimed in claim 1, further comprising:
a shell having an interior to contain the first sensing unit, the second sensing unit, the antenna, the wireless communication unit, and the battery unit being mounted in the interior of the shell, wherein the shell is composed of a metal part and an insulating part;
an electrode configured to be mounted on the insulating part of the shell to be electrically insulated from the metal part;
wherein the battery unit comprises a power protection element and a battery;
wherein the power protection element is electrically connected to the metal part of the shell and the electrode, and the wireless communication unit is electrically connected to the battery through the power protection element.

4. The thermometer as claimed in claim 3, wherein a tip is formed on a terminal of the metal part of the shell;
wherein the insulating part is connected to an end of the metal part which is opposite to the tip.

5. The thermometer as claimed in claim 1, wherein the wireless communication unit further executes a communication setting procedure before the measuring procedure to:
wirelessly broadcast a beacon signal;
determine whether a pairing request is received;
when the pairing request is received, determine whether an assigned identifier and a reference signal are received, wherein the reference signal comprises cooking information, and the cooking information comprises a target temperature value, a warning temperature value and a reference finish time; and
when the assigned identifier and the reference signal are received, execute the measuring procedure.

6. The thermometer as claimed in claim 5, wherein when the second temperature value gradually drops below a predetermined temperature for a first predetermined time period after the first temperature value exceeds the target temperature value, the measuring procedure is determined to be terminated.

7. The thermometer as claimed in claim 5, wherein when the second temperature value gradually drops below a predetermined temperature for a second predetermined time period after the first temperature value exceeds the warning temperature value, the measuring procedure is determined to be terminated.

8. A temperature monitoring system, comprising:
a thermometer, configured to comprise:
a first sensing unit configured to sense an internal temperature of a monitored object to produce a first temperature value;
a second sensing unit configured to sense an ambient temperature external to the monitored object to produce a second temperature value;
an antenna;
a wireless communication unit configured to be electrically connected to the first sensing unit, the second sensing unit, and the antenna, wherein the wireless communication unit comprises a memory storing a first previous temperature value and a second previous temperature value, wherein the wireless communication unit counts a monitoring time at first, and executes a measuring procedure to:
load the first previous temperature value and the second pervious temperature from the memory;
acquire the first temperature value and the second temperature value from the first sensing unit and the second sensing unit;
produce and wirelessly broadcast a temperature information signal when a difference between the first temperature value and the first previous temperature value exceeds a first threshold value or when a difference between the second temperature value and the second pervious temperature exceeds a second threshold value;
store the first temperature value and the second temperature value in the memory to respectively replace the first previous temperature value and the second previous temperature value in the memory;
wherein the wireless communication unit executes a time interval producing procedure after the measuring procedure to:
determine a time interval according to the monitoring time and the second temperature value; and
determine whether the measuring procedure is terminated;
when the measuring procedure is not terminated, execute the measuring procedure again after the time interval; and
when the measuring procedure is terminated, switch to a low power mode; and
a battery unit configured to be electrically connected to the wireless communication unit to provide an output voltage to the wireless communication unit; and
a first communication device, configured to communicate with the thermometer to send an assigned identifier and a reference signal to the thermometer, and to acquire the temperature information signal from the thermometer;
wherein the reference signal comprises cooking information, and the cooking information comprises a target temperature value, a warning temperature value and a reference finish time;
wherein the temperature information signal comprises temperature information, wherein the temperature information comprises the first temperature value and the second temperature value.

9. The temperature monitoring system as claimed in claim 8, further comprising:
a Wi-Fi router; wherein the first communication device is wirelessly connected to the Wi-Fi router;
a second communication device, configured to be wirelessly connected to the first communication device via the Wi-Fi router to acquire the temperature information.

10. The temperature monitoring system as claimed in claim 9, further comprising:
a cloud server, configured to communicate with the first communication device via the Wi-Fi router and a network;
wherein when the first temperature value reaches the warning temperature value, the first communication device sends a first notification signal to the cloud server via the Wi-Fi router and the network;
wherein when the first temperature value reaches the target temperature value, the first communication device sends a second notification signal to the cloud server via the Wi-Fi router and the network;
wherein when the second temperature value gradually decreases below a first abnormal temperature value or exceeds a second abnormal temperature value, the first communication device sends a third notification signal to the cloud server via the Wi-Fi router and the network;
wherein the cloud server further sends the first notification signal, the second notification signal and the third notification signal to the second communication device via the Wi-Fi router and the network.

11. The temperature monitoring system as claimed in claim 8, further comprising:
a Wi-Fi router; wherein the first communication device is wirelessly connected to the Wi-Fi router;
a cloud server, configured to communicate with the first communication device via the Wi-Fi router and a network;
a second communication device, configured to communicate with the cloud server via the network to acquire the temperature information;
wherein when the first temperature value reaches the warning temperature value, the first communication device sends a first notification signal to the cloud server via the Wi-Fi router and the network;
wherein when the first temperature value reaches the target temperature value, the first communication device sends a second notification signal to the cloud server via the Wi-Fi router and the network;
wherein when the second temperature value gradually decreases below a first abnormal temperature value or exceeds a second abnormal temperature value, the first communication device sends a third notification signal to the cloud server via the Wi-Fi router and the network;
wherein the cloud server further sends the first, second, and third notification signals to the second communication device via the network.

12. The temperature monitoring system as claimed in claim 8, further comprising:
a cloud server;
a Wi-Fi router;
a third communication device, configured to be wirelessly connected to the thermometer to acquire the temperature information signal, and wirelessly connected to the Wi-Fi router, wherein the first communication device is wirelessly connected to the third communication device via the Wi-Fi router to send the cooking information to the third communication device and to acquire the temperature information from the third communication device;
a second communication device;
wherein the second communication device acquires the temperature information from the third communication device via the Wi-Fi router when the second communication device is within a coverage range of the Wi-Fi router;
wherein the second communication device acquires the temperature information from the cloud server via a network when the second communication device is out of the coverage range of the Wi-Fi router;
wherein the third communication device is further configured to communicate with the cloud server via the network and the Wi-Fi router to send the received temperature information to the cloud server;

wherein when the first temperature value reaches the warning temperature value, the third communication device sends a first notification signal to the cloud server via the Wi-Fi router and the network;

wherein when the first temperature value reaches the target temperature value, the third communication device sends a second notification signal to the cloud server via the Wi-Fi router and the network;

wherein when the second temperature value gradually decreases below a first abnormal temperature value or exceeds a second abnormal temperature value, the third communication device sends a third notification signal to the cloud server via the Wi-Fi router and the network;

wherein the cloud server further sends the first, second, and third notification signals to the first communication device and the second communication device via the network.

13. The temperature monitoring system as claimed in claim 12, wherein the first communication device, the second communication device or the third communication device determine a remaining time according to a finish time when the first temperature value reaches the target temperature value and a current time when a current first temperature value is measured and transmitted;

wherein determination of the remaining time comprises:
obtaining a current temperature change rate according to the current first temperature value and a first temperature value received at a previous time; and
estimating the remaining time according to the current first temperature value, the current time, the target temperature, a desired temperature of a cooking vessel, the current temperature change rate and an offset value;

wherein the desired temperature of the cooking vessel is preprogrammed from the first communication device.

14. The temperature monitoring system as claimed in claim 13, wherein the offset value is further determined according to a plurality of previous temperature change rates.

* * * * *